(12) United States Patent
Kolarov et al.

(10) Patent No.: US 10,957,358 B2
(45) Date of Patent: Mar. 23, 2021

(54) REFERENCE AND NON-REFERENCE VIDEO QUALITY EVALUATION

(71) Applicant: Apple Inc., Cupertino, CA (US)

(72) Inventors: Krasimir D. Kolarov, Menlo Park, CA (US); Steven E. Saunders, Cupertiono, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/252,425

(22) Filed: Jan. 18, 2019

(65) Prior Publication Data

US 2019/0172494 A1    Jun. 6, 2019

Related U.S. Application Data

(60) Continuation of application No. 15/137,998, filed on Apr. 25, 2016, now Pat. No. 10,186,297, which is a division of application No. 13/903,652, filed on May 28, 2013, now Pat. No. 9,325,985.

(51) Int. Cl.
| | |
|---|---|
| *G11B 27/031* | (2006.01) |
| *H04N 17/00* | (2006.01) |
| *H04N 19/426* | (2014.01) |
| *G06K 9/00* | (2006.01) |
| *G06K 9/52* | (2006.01) |
| *G06K 9/62* | (2006.01) |

(Continued)

(52) U.S. Cl.
CPC ........ *G11B 27/031* (2013.01); *G06K 9/00718* (2013.01); *G06K 9/52* (2013.01); *G06K 9/6202* (2013.01); *G06T 5/00* (2013.01); *G06T 7/0002* (2013.01); *H04N 17/002* (2013.01); *H04N 17/004* (2013.01); *H04N 19/426* (2014.11); *G06T 2207/30168* (2013.01)

(58) Field of Classification Search
CPC .. G11B 27/031; H04N 19/426; H04N 17/002; H04N 17/004; G06K 9/00718; G06K 9/52; G06K 9/6202; G06T 5/00; G06T 7/0002; G06T 2207/30168
See application file for complete search history.

(56) References Cited

U.S. PATENT DOCUMENTS

| | | |
|---|---|---|
| 5,446,492 A | 8/1995 | Wolf et al. |
| 5,793,425 A | 8/1998 | Balakrishnan |
| 6,055,015 A | 4/2000 | Edwards |

(Continued)

*Primary Examiner* — Michael E Teitelbaum
(74) *Attorney, Agent, or Firm* — Fish & Richardson P.C.

(57) ABSTRACT

Devices and methods for determining image quality using full-reference and non-reference techniques. Full reference image quality may be determined prior to output of an image or video frame from an image sensor processor by temporarily retaining image data from the image sensor and comparing processed image data of the image to the retained, non-processed image data of the same image. Full reference image quality determination may be assisted by a heuristic-based fault indicator. Image quality may also be determined by a non-reference technique of matching the image to one of various scenarios that are associated with sets of heuristics and applying the heuristics of the particular scenario to the image. Instead of relying on a nominal frame rate, video timing quality may be determined by comparing the capture time interval between successive video frames to the presentation time interval of the same video frames.

28 Claims, 10 Drawing Sheets

(51) Int. Cl.
*G06T 5/00* (2006.01)
*G06T 7/00* (2017.01)

(56) References Cited

U.S. PATENT DOCUMENTS

| | | | |
|---|---|---|---|
| 6,463,163 B1 * | 10/2002 | Kresch | G06K 9/00228 348/169 |
| 6,850,265 B1 | 2/2005 | Strubbe et al. | |
| 9,325,985 B2 | 4/2016 | Kolarov et al. | |
| 1,018,629 A1 | 1/2019 | Kolarov et al. | |
| 2002/0120634 A1 | 8/2002 | Min et al. | |
| 2002/0168010 A1 | 11/2002 | Ali | |
| 2003/0179942 A1 | 9/2003 | Okada et al. | |
| 2003/0206658 A1 | 11/2003 | Mauro, II et al. | |
| 2005/0238321 A1 | 10/2005 | Gohara et al. | |
| 2006/0140493 A1 | 6/2006 | Mauro, II et al. | |
| 2006/0140614 A1 * | 6/2006 | Kim | G06K 9/00228 396/153 |
| 2006/0200759 A1 | 9/2006 | Agrawala et al. | |
| 2006/0259863 A1 * | 11/2006 | Obrador | G11B 27/034 715/723 |
| 2008/0019661 A1 | 1/2008 | Obrador et al. | |
| 2008/0089561 A1 * | 4/2008 | Zhang | G06K 9/00228 382/118 |
| 2008/0267458 A1 * | 10/2008 | Laganiere | G06K 9/00221 382/118 |
| 2009/0147143 A1 | 6/2009 | Sherif et al. | |
| 2010/0067749 A1 * | 3/2010 | Kusama | G06T 1/00 382/118 |
| 2010/0309987 A1 | 12/2010 | Concion et al. | |
| 2012/0002059 A1 | 1/2012 | Levy et al. | |
| 2012/0033875 A1 | 2/2012 | Bergman et al. | |
| 2012/0106790 A1 * | 5/2012 | Sultana | G06K 9/00228 382/103 |
| 2012/0281115 A1 | 11/2012 | Kouncar | |
| 2014/0354826 A1 | 12/2014 | Kolarov et al. | |
| 2016/0240224 A1 | 8/2016 | Kolarov et al. | |

\* cited by examiner

REFERENCE AND NON-REFERENCE VIDEO QUALITY EVALUATION

This application is a continuation of U.S. patent application Ser. No. 15/137,998, filed Apr. 25, 2016, which is a divisional of U.S. patent application Ser. No. 13/903,652, filed May 28, 2013, now U.S. Pat. No. 9,325,985, which are hereby incorporated by reference herein in their entirety.

BACKGROUND

Technical Field

This disclosure relates generally to video quality evaluation, and, more specifically, to full-reference and non-reference video quality evaluation of live video.

Description of the Related Art

Non-real-time video quality evaluation can be performed to ascertain the quality of a video. For example, video can be evaluated to ascertain differences between the video and the actual scene that the video captured or to ascertain differences between versions of the same video. For instance, video capture devices may add imperfections to the video due to imperfect lenses, deficient software or failures of hardware as well as imperfect coding and decoding schemes used to create and view compressed versions of the video. In other instances, environmental factors such as low light or fast movement of objects in the scene also contribute to poor quality video. Video quality evaluation can identify such deficiencies. There are multiple ways to evaluate video quality. For example, evaluation may be performed by measuring quantitative or qualitative attributes of the video itself or by manually comparing different versions of a video to one another and analyzing the visual differences.

Due to hardware and software restrictions, video quality evaluation may be performed on a different machine from where the video was recorded. For example, video recording is often performed with portable devices that suffer from constrained memory and processing power due to weight or power restrictions associated with portable devices. The constrained memory and processing power of these capture devices makes simultaneous video recording and video analysis infeasible. Consequently, video quality evaluation is normally performed, if at all, at a separate time and on a different device from when the video was recorded. However, the original unencoded and unimpaired frames are not available on the different device and full reference comparison cannot be performed without the original uncompressed frames.

SUMMARY OF EMBODIMENTS

Embodiments of the present disclosure describe a computing device, including an image sensor, one or more image data processing components configured to process the image data from the sensor, a buffer configured to temporarily store the image data prior to processing by at least one of the one or more data processing components, and a reference image data quality comparator. The reference image data quality comparator may be configured to perform a comparison of image data from the buffer to processed image data, wherein the processed image data has been processed by the at least one of the one or more image data processing components. The comparison may be performed prior to output of an image or video frame from the image sensor data processor and the image or video frame comprises data corresponding to the processed image data. The reference image data quality comparator may output a quality indicator for the processed image data based on the comparison. In some embodiments, the comparison and output of a quality indicator for the processed image data may be performed after output of an image or video frame from the image sensor data processor. For example, the processing may be performed, subsequently, on the same device, or on another device.

Various embodiments also, or alternatively, include a method of evaluating an image with scenario-specific heuristic sets to determine an image quality metric measurement. For example, obtaining an image, evaluating the image to determine an image content scenario for the image, and selecting a heuristic set from among a plurality of scenario-specific heuristic sets, wherein each scenario-specific heuristic set corresponds to a different image content scenario, wherein said selecting is based on the determined image content scenario. The method may further include analyzing the image based on the selected scenario-specific heuristic set to determine one or more image quality metric measurements for the image and outputting the image quality metric measurement.

Some embodiments are directed to a method of comparing a capture time interval to a presentation time interval to determine a video timing quality metric. For example, providing video frames for presentation on a display, measuring a presentation time interval between presentations of successive frames, and obtaining a capture time interval for the same successive frames for which the presentation time interval is measured. The capture time interval may indicate a time interval between capture of the successive frames by a video recording device used to create the at least a portion of the video frames. The method further includes comparing the measured presentation time interval to the capture time interval to determine a measurement for a video timing quality metric, and outputting a value for the video timing quality metric.

Figure 1:
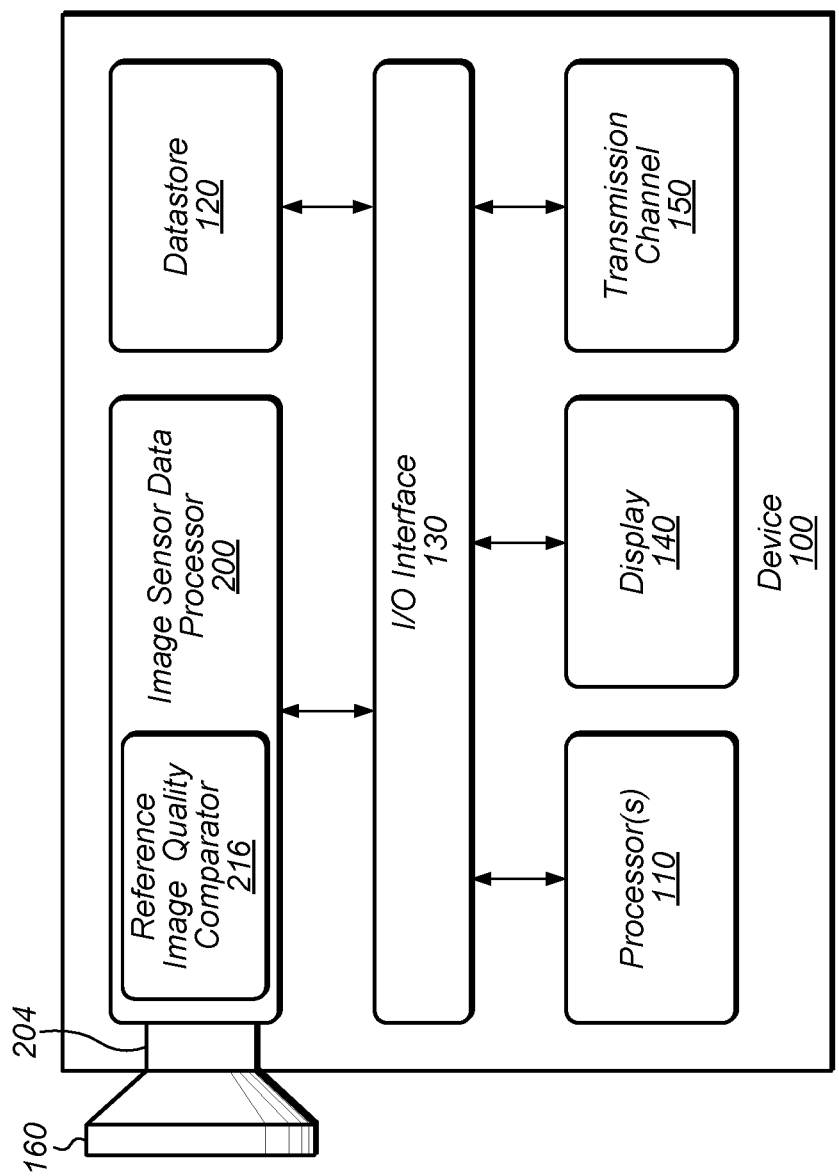
FIG. 1 illustrates a video recording, evaluation, display and transmission device in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g. a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a device, system and method for evaluating live video quality for a video capture device are described. In some embodiments, the evaluation circuitry, systems and methods described herein may be implemented as part of various devices, including but not limited to, mobile phones that have video capture or video streaming functionality, tablet computing devices, and/or personal video recording devices. A user of such devices may interact with a video capture application capable of evaluating live video quality, so that it provides feedback to the user regarding the quality of the video being captured in real-time with the capture. Various embodiments disclosed herein may be used to evaluate live video or other image quality before the images or video are made available to the central processing unit of the device. For example, image quality evaluation may be performed by integration of various components into the image sensor data processor that processes image data directly from the image sensor. In some embodiments, the image sensor data processor is implemented as an ASIC directly coupled to the image sensor.

In some embodiments, when recording or streaming video, a user may be unaware that the quality of the video being recorded or streamed is less than desired. In some current video systems, the only way the user becomes aware of the low quality video is when the recording is reviewed or when the recipient of the stream notifies the sender. Sometimes this is after the recording or streaming opportunity has passed. Various devices (especially mobile devices that send and receive video) must compress the video for practical use on available communications channels or, to save to local media. Most devices do not have a sufficiently large channel to transmit unencoded media or to store the unencoded video. This means that the images captured directly by the image sensor (e.g., raw frames) are fed to an encoder and discarded instead of being transmitted or saved. Because of this, the original images are not present to be compared with the decoded images either in the sending device or in any receiving device and therefore, full-reference video quality estimation is impossible under such circumstances.

Encoding may produce image data that cannot be readily compared to the original image. As such, in some embodiments, encoded image data must be decoded before it can be compared to the original image. For example, when encoding includes a compression algorithm, the compressed image data is not in a state suitable for comparison to the original image data. Thus, the compressed image data is uncompressed before comparison.

Additionally, full reference image quality evaluation is particularly well-suited to analysis of lossy compression schemes where it is expected that image information will be lost in the compression. In some embodiments, image quality evaluation can determine if the lost image information is within an acceptable level or not, for example, by evaluation of video quality to determine a video quality metric measurement.

In some embodiments, the systems and methods described herein may enable a computing device to implement live video recording or transmission while evaluating the quality of the captured video in real time using full reference techniques. In some embodiments, a user may receive instantaneous or nearly instantaneous feedback regarding the quality of the video being recorded or transmitted based upon the evaluation. More specifically, the video quality evaluation tool described herein may evaluate decoded or decompressed video in real time by comparing the decoded or decompressed video to preprocessed images that were retained after pre-processing but before encoding in order to estimate the quality of the compressed or encoded video. Devices, particularly portable devices, but others as well, typically provide little additional storage space for retaining the high quality and data-intensive image data. Typically, they provide storage of this unencoded data only long enough for an image sensor pipeline to turn the data into encoded data and then discard the unencoded original image data. In some embodiments described herein, the unencoded data may be retained for an additional period of time or additional memory may be provided to support the evaluation. In some embodiments, memory may be freed up for reuse as soon as possible while still providing retention of the image data long enough for comparison.

As described above, mobile devices have been unable to support live video quality estimation calculations based upon both the original uncompressed/unimpaired frames and the compressed/impaired frames. As disclosed herein, in some embodiments, when the quality of video is estimated to fall below a threshold, the user may be notified of the low quality video while the video is being captured. In some embodiments the video image quality may be stored in metadata associated with the video.

In order for a device to provide the original capture frames (e.g., raw images) for full-reference video fidelity (VF) analysis, the uncompressed original capture frames must either be stored for later use in VF analysis or transmitted to a receiver for VF analysis. However, since uncompressed video is about 10 to 50 times the bit bulk of the compressed video, handling it can strain the internal busses of the device and the local fast storage of the device or the device's communication channel(s) as well. Many mobile devices are unable to provide full-reference VF because one or more of these resources are inadequate for the task. In some embodiments described herein, image sensor output (e.g., the raw image, or pre-processed image) is saved. For example, image sensor output may be saved long enough to compare it to a processed (e.g., compressed and decompressed) version of the image before discarding the image sensor output. In some embodiments, the image sensor output may be pre-processed before compression and the image that is retained may be the pre-processed image.

Figure 2:
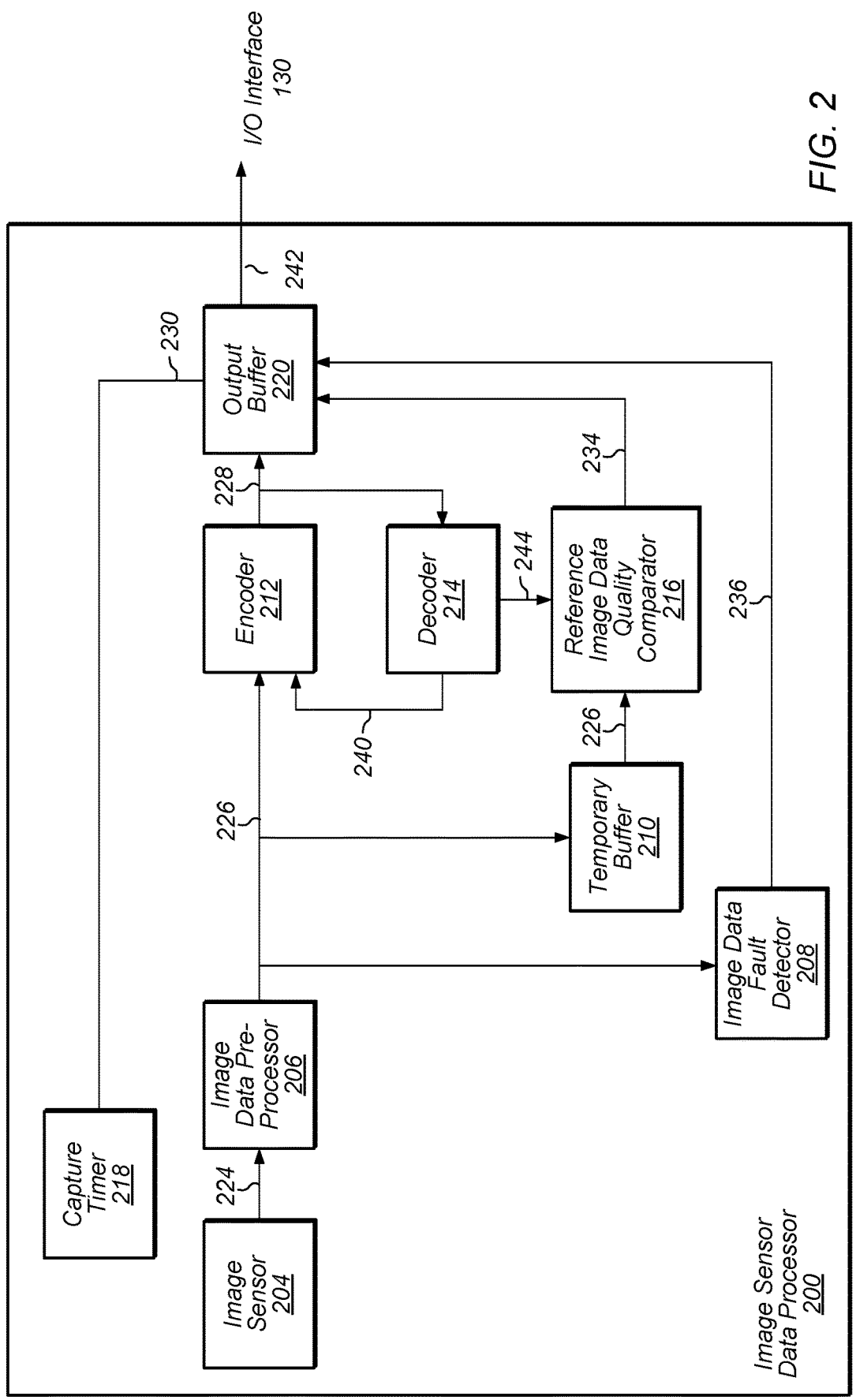
FIG. 2 illustrates a block diagram of example components for an image sensor data processor in accordance with some embodiments.

Image quality evaluation may be performed by various components of the image sensor data processor that processes image data directly from the image sensor. In some embodiments, the image sensor data processor includes an image sensor pipeline including the image sensor, an image data pre-processor, an encoder and a decoder. As illustrated in FIG. 2 and described below, an image sensor data processor may include components in addition to the image sensor pipeline. For example, a temporary buffer, an image data fault detector, a reference image data quality comparator, a capture timer, and an output buffer, although various other configurations are contemplated as well.

Video capture operations may be tailored to minimize the impact on device 100 (FIG. 1) resources. In some embodiments, rather than discarding the original capture frames as soon as encoding is done, the original capture frames may be retained. In some embodiments, the original capture frames are retained for a relatively short period of time. For example, only as long as needed for supporting the VF analysis or, for just a few frames beyond the end of encoding. In some embodiments, device 100 may use the codec's reference frame retention buffer (not illustrated) to provide target video frames. In some embodiments, the codec itself may be modified or augmented, for example, so that the non-reference frames are decoded. Video capture operations may also be tailored to run the VF computation as soon as each frame is decoded, and then discard the original capture frame (and, if a non-reference frame, the decoded frame).

In some embodiments, the codec's reference frame retention buffer is used to provide reference frames for comparison. Some codecs may already have functionality for decompressing coded images and the data from the decompressed images may be used for the comparison. For example, some codecs include instructions for decompressing I and P frames (Intra-coded frames are sometimes referred to as I-frames; they are fully specified pictures much like a conventional static image file. Predicted picture frames are sometimes referred to as P-frames; they hold only the changes in the image from a previous frame. Bi-predictive frames are sometimes referred to as B-frames because they use differences between the current frame and both a preceding and following frames to specify content; many codecs may not provide decompression instructions for B-frames). In various embodiments, the codec may be modified or augmented so that non-reference frames are decoded. In some embodiments, a VF computation is run between the image sensor output (e.g., pre-processed image frame) and the decoded frame. For example, as soon as each frame is decoded, the pre-processed frame may be compared to the decoded version of the codec's reference frame (or non-reference frame) and then the raw image (and, if non-reference, the decoded frame) may be discarded. In some embodiments, decoding of non-reference frames may not be mandatory.

In some embodiments, the quality computations can be done in the same sequence so that the pre-processed image does not need to be retained until the end of the frame decoding. For example, when the flow of processing within a codec is sequential by sub-groups of pixels (e.g. by macroblock). In such circumstances, some of the pre-processed image data can be discarded earlier, freeing up memory.

Even in the absence of reference information, or when it is impractical or undesirable to make use of full reference, it is possible to achieve measurements of value. In some embodiments, the video quality evaluation tool, application or circuitry may recognize a fault by using various heuristics. For example, a fault detector may be configured with heuristic tests that can sometimes detect that the camera has failed, that the pre-processing is not functioning property or that something else is wrong. For example, black frames continuously, solid green frames, frames with identical values (cameras will typically have some noise), and other patterns can be taken as indicators of probable malfunction or mis-operation (e.g. lens cap on). These characteristic can be used to produce fault indicators. For example, a device on which the tool or application is implemented may include a protective cap for the lens or the device may have the image sensor located where it may be mistakenly covered by the user's fingers attempting to hold the device. If the device is recording with the cap on or with the image sensor covered with a finger, the device may recognize all black frames or all skin-tone frames, for example. Exemplary responses to a fault determination may be to issue a notification, create a metric measurement, or prevent the device from recording or transmitting at all.

The heuristics may be built upon characteristics particular to graphical imagery. For white balance as an example, very close correspondence in luma and also close correspondence in each chroma channel should be seen after allowing for the overall shift and scaling due to the white balance corrections. However, other pre-processing functionality may have other criteria. The heuristic checks for the image sensor and pre-processing functions may be used in combination with either full-reference or non-reference video fidelity measurement (VF).

Another way to determine image quality is the application of scenarios. A scenario-based quality analyzer may apply various scenarios to an image in an attempt to match a predetermined scenario with the image. An example of an exploitable scenario is the presence of a human face. This may be detected and checked by finding a large area with chroma lying within the human skin-tone chromaticity range. In this scenario, some features to check for are facial features such as eyes, eyebrows, nose, lips, ears, and if present, eyeglasses. In these facial feature areas, the scenario recognition module may be configured to apply a heuristic in accordance with finding high contrasts and sharp detail in the facial area and to report video quality problems if those characteristics are not found.

Other exemplary scenarios include recognition of an outdoor landscape, with blue sky, green foliage, and brown ground. This scenario may be checked by looking for relatively featureless blue above highly textured green. The quality checking heuristic may emphasize detail sharpness in the foliage areas. Another example scenario may recognize a city landscape, with dominant rectangular features in neutral hues. The quality checking heuristic could emphasize sharp edges of the rectangular features (buildings). Scenarios may misidentify images, for example when a wall color happens to fall within the skin-tone range. However, even a misidentified scenario may produce a useful result from the quality testing.

Video timing has a long-standing tradition of an assumed uniform capture rate and the corresponding assumption that frames are presented at their correct relative times. The assumption allows for many simplifications to be built into video quality estimation calculation (e.g., that the respective frames of two versions of a video may be compared one-to-one). However, many modern devices, especially mobile devices, commonly capture video frames with irregular timing, and mobile communications commonly imposes additional irregularity on presentation timing. As described herein, irregular presentation timing is an impairment that can be measured in conjunction with spatial impairments. In some embodiments, a process for determining a video presentation timing metric measurement may take, as an input, an actual capture time for each time frame or actual time intervals between frames instead of an assumed time or interval based upon a fixed frame rate.

In some embodiments, the video quality evaluation tool or application may evaluate temporal characteristics of the video. For example, captured video may exhibit irregularity from what was observed in the scene captured by the video. Some of this irregularity may be a result of the reliance upon assumed frame rates that are not technically enforced. For example, imagers can take varying amount of time from the capture command to deliver a frame depending on the light level. In other instances, facilities provided by the image processor for timing of capture requests may not result in precise timing to the imager device pins. Additionally, the timing of capture requests may be generated to suit other hardware events rather than for perfect regularity. Furthermore, the timing facilities in the receiver may adjust playback timing to follow the display device row sweep rather than the capture timestamp interval. Also, networks change their delay buffering when packets are lost or when routing changes. As such, for various reasons, video playback may exhibit timing irregularity.

However, especially in scenes where there is large-scale motion (such as a pan) or large scale brightness changes, timing aberrations may cause viewers to see the scene motion jump or stutter, even when every image is played with high pixel fidelity and every frame is played in order. As described herein, correct timing means that the intervals between the presentation of images or frames match the intervals between their capture. Regularity of the intervals themselves may not be required for correct playback or for correct calculation of fidelity. Playback timing irregularity that has a strong correspondence to the original capture timing may be regarded as high fidelity. As such, in some embodiments, the image sensor data processor records precise time intervals between frame captures. In various embodiments, this will overcome the deficiencies of reliance upon an assumed but unenforced frame rate. In other embodiments, frame timing jitter, or, the mismatch between capture timing and playback timing is estimated for its impact on subjective quality of the video. In various embodiments, capture times, or time intervals need not be global nor absolute. However, capture times, or time intervals may be of a much finer precision than the nominal frame rate.

Temporal displacement measurement may be performed using a simulator. For example, an uncompressed reference video may be compressed, packetized, and subjected to simulated network loss conditions and/or simulated receiver timing conditions. In another example, the stream of compressed video from a mobile device on a lossless network may be captured for replay under various simulated network impairments.

For computerized devices, it may be difficult to determine the actual presentation time (e.g., when the light of a corresponding image leaves the display) Computer operating systems provide player services that handle and hide the details of getting a decoded image or frame transformed into light leaving a display. For timing quality measurement, the reference is not an image, but rather a time stamp, time interval, or other record of the actual effective time that an image (e.g., a frame of video) was captured. Since image capture is not instantaneous, but requires a finite interval during which light is accumulated in the imager (e.g., shutter speed), the end of the capture interval may be the reference time. Other conventions may be adopted and applied with corresponding adjustments in the measurement operations. Note that it may not be necessary or even desirable to keep the absolute time for the time stamps since the playback will occur later, at a different absolute time. Instead, the image-to-image (or frame-to-frame) interval may affect perceptual fidelity. As such, in various embodiments, it is the time difference since a previous frame's capture time that may be calculated, stored, or maintained along with the corresponding image. Note that the first frame of a video or capture sequence may not have a relative time stamp. In some embodiments, the absolute time of the image capture may not be determined at all, instead, only time intervals between frame captures may be determined.

In order to measure fidelity of presentation timing, the presentation timing may be measured. There are several ways to get a sufficiently accurate time for presentation of an image. However, in some embodiments, the time at which a program hands off a picture buffer to the operating system for display (and the like) is not sufficient. One way to get sufficiently accurate time for presentation of an image is to observe a change between images. Once successive images have been identified as having observable changes, the timing interval between presentations of those successive images can be compared to the interval between the capture of the same successive images. For example, by choosing a pixel in the decoded frame about to be presented, then observing the corresponding value in the screen buffer memory that is transmitted to the display hardware, and sampling the screen buffer location repeatedly until it changes. The known, predicted, or reported timing of the display hardware transmission may then be adjusted accordingly. In some embodiments, the last (bottom-right for most displays) pixel of a frame may be used. Other embodiments may use a pixel other than the last pixel. For example, some pixels may be chosen because they change more often than others. Some embodiments may include sampling more than one pixel per frame. A change of at least one of the sampled pixels in the frame may indicate a change between successive frames. It may not be necessary that the same pixel change successively to determine a time or time interval. The change of any of the sampled pixels may be used to determine the presentation time or time interval between frames. Note that, if either capture or display is regular, the corresponding frame-to-frame time intervals may be taken as given.

In some embodiments, video may be analyzed before it is processed to determine a timing metric measurement. For example, video may be analyzed one time to determine and record those pixels particularly suited to determining presentation timing (e.g., a pixel may be particularly suited if it changes for successive frames) and then those particular pixels may be the ones that are monitored during a process of presentation timing analysis. A timing quality or timing fidelity metric may be based upon the measurement of both captured and presented inter-frame timing. For example, on one end of the timing metric scale is perfect fidelity which is a perfect match between the capture and presentation inter-frame times, and on the other end of the timing metric scale, the magnitude of difference between corresponding inter-frame times exceeds the nominal inter-frame timing for constant frame rate. Sometimes, the individual timing differences (e.g., frame-by-frame) may be pooled or aggregated together into a quality metric measurement for the entire video segment.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable devices include, without limitation, the iPhone®, iPod Touch®, and iPad® devices from Apple Inc. of Cupertino, Calif. Other portable electronic devices, such as laptops or tablet computers with or without touch-sensitive surfaces (e.g., touch screen displays and/or touch pads), may also be used. Other exemplary devices include camcorders, video cameras, digital cameras and news gathering cameras. It should also be understood that, in some embodiments, the device is not a portable communications device, but is a desktop computer with or without a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

Attention is now directed toward embodiments of image and video capture and recording devices. FIG. 1 is a block diagram illustrating a portable video and recording device 100 with lens 160, image sensor 204, image sensor data processor 200 (which may include a reference image quality comparator 216), data store 120 (which may include one or more computer readable storage mediums), processor(s) 110 (which may include one or more graphics processing units (GPU), and touch-sensitive display 140, in accordance with some embodiments. Touch-sensitive display 140 is sometimes called a "touch screen" for convenience, and may also be known as or called a touch-sensitive display system or simply the display. Device 100 may include transmission channel 150 (which may include RF circuitry). These components may communicate over one or more communication buses or signal lines identified as I/O Interface 130.

FIG. 1 illustrates an exemplary embodiment of an image capture device 100 for capturing images or video frames, according to some embodiments. In some embodiments, FIG. 1 illustrates an exemplary image display or video player device 100 for displaying images or playing videos. In some embodiments, device 100 may support functionality for both capturing images or video frames with image sensor 204 as well as displaying images or playing videos on display 140. In some embodiments, FIG. 1 illustrates one of a plurality of similar devices that capture and share images or video among one another, for example via transmission channel 150. In various embodiments, a device such as the one illustrated in FIG. 1 may capture and record an image or video and send the image or video to another device similar to the one illustrated in FIG. 1 and the similar device may display or play the image or video captured by the other device.

It should be appreciated that device 100 is only one example of a portable video capture and recording device, and that device 100 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits (ASIC).

As noted above, transmission channel 150 may comprise RF (radio frequency) circuitry that receives and sends RF signals, also called electromagnetic signals. In some embodiments, the RF circuitry of transmission channel 150 converts electrical signals to/from electromagnetic signals and communicates with communications networks and other communications devices via the electromagnetic signals. The RF circuitry of transmission channel 150 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. In some embodiments, transmission channel 150 may comprise a wire or cable or a fiber-optic link or a free-space optical link.

Display 140 provides an input interface and an output interface between the device and a user. Display 140 displays visual output to the user. The visual output may include graphics, text, icons, video, and any combination thereof (collectively termed "graphics").

Device 100 may also include one or more image sensors. Image sensor 204 may also be known as or called an optical sensor 204. Optical sensor 204 may include charge-coupled device (CCD), complementary metal-oxide semiconductor (CMOS) phototransistors or other photo sensors known in the art. Optical sensor 204 receives light from the environment, projected through one or more lens 160, and converts the light to data representing an image. Optical sensor 204 may capture still images or video. In some embodiments, an optical sensor is located on the back of device 100, opposite display 140 on the front of the device, so that the display 140 may be used as a viewfinder for still and/or video image acquisition. In some embodiments, another optical sensor is located on the front of the device so that the user's image may be obtained for videoconferencing while the user views the other video conference participants on the touch screen display.

FIG. 2 illustrates exemplary image sensor data processor 200 that is configured, among other functionality, to process captured images into processed versions of the captured image and evaluate the quality of the processed version of the captured image. In some embodiments, a processed version of the captured image is compared to the captured image to determine the quality of the processed version. For example, a decompressed version of the captured image may be compared to the captured image to determine an image quality of the decompressed version. In some embodiments, the image quality evaluates the performance of a lossy compression scheme used to create the (compressed and then) decompressed version of the captured image.

As described above, image sensor data processor 200 may interoperate with image sensor 204, display 140, transmission channel 150, and datastore 120 via I/O interface 130 while performing various functions such as image capture, processing, coding, evaluation (including scenario recognition), storage and transmission. In some embodiments, image sensor data processor 200 may be implemented as a single programmable application-specific integrated circuit (ASIC). In other embodiments, multiple separate integrated circuits can be used.

Image sensor 204 of the image sensor data processor 200 captures images. In some embodiments, image sensor 204 may be part of the image sensor data processor 200, while in other embodiments, image sensor 204 may be separate from image sensor data processor 200. The image data pre-processor 206 may perform pre-processing adjustments to a captured raw image such as adjustments for white balance or adjustments for lens distortions, for example. The adjustments may be implemented via ASIC or software, or a combination thereof.

In some embodiments, image sensor data processor 200 may retain sensor output images long enough to compare the retained images to the decoded reference frames created from the output images. The comparison may analyze various quantitative characteristics of the retained image and the decoded reference and assign a value to the comparison results. In various embodiments, the value may be saved (e.g., as metadata for the processed image) and the retained image may be discarded to free up memory for retaining other images from the image sensor 204. This process of capturing an image, buffering the image, coding the image, decoding the image, comparing the buffered image to the decoded image, and determining a quality indicator of the processed image and may be repeated as an on-going process, for example, for multiple macroblocks of an image, for multiple frames of a video, or for multiple still photos.

In some embodiments, the images are processed portion by portion, for example, macroblocks, stripes, or other regions of the image data may be used. Instead of waiting for the entire image frame to be decoded, the quality analysis may be performed as portions of the frame become available. Such processing may require reorganization of the VF computation. For example, the VF computation may process one decoded macroblock of a frame at a time. Although, in some examples, a few of the macroblocks may be analyzed at a time. For example, the VF computation may be reorganized to operate on neighboring macroblocks to perform overlap calculations. The macroblocks may be discarded as soon as they are no longer needed. For example, as soon as the macroblock has been used for comparison.

As described in the exemplary embodiment above, portions of the frame can be decoded (e.g. macroblocks of B-frames, stripes, or other contiguous regions) over time instead of the entire frame at once. In this scheme, the VF computation may be adjusted for operation with the smaller samples. For example, the VF computation may include analysis of neighboring portions (e.g., for overlap calculations of macroblocks). In some embodiments, VF results may be generated by combining the per-macroblock results after all the macroblocks are completed. In some embodiments, the quality indicator calculations may be performed in the same sequence as the flow of processing within the codec such that portions of the reference frame data can be discarded earlier. This can lead to earlier re-use of memory, for example, when the flow of processing is sequential by macroblock. The final VF results may be generated by combining the per-macroblock metric results after all macroblocks are done (e.g. MSE, SSIM and Row-Col metrics). Combination of sub-regional partial metric calculations may be possible for VF metrics such as mean-square error (MSE), structural similarity (SSIM), mean structural similarity (MSSIM) and Row-Col metrics, for example. These metrics may also be calculated for other image quality comparisons, for example, non macro-block based comparisons.

In various embodiments, image sensor data processor 200 may apply one or more heuristics to evaluate image quality. A diagnostic heuristic for lens-cap-on may be defined for receiving all black frames, for example. The lens-cap-on scenario may be associated with a heuristic such as issuing an alert (e.g., visual, audible or tactile) indicating the lens cap is on, or recording the scenario in metadata associated with the frame. In another example, a heuristic for failed white balance pre-processing may be defined as very close correspondence in luma and also close correspondence in each chroma channel after allowing for the overall shift and scaling due to the white balance corrections. A quality problem or fault may be reported if these characteristics are not found. For example, as metadata for the image or video frame. Various other heuristic-based fault determinations are also contemplated (e.g., heuristic faults for enclosure faults, lens faults, imager chip faults, data connection faults, or local storage faults).

Figure 7:
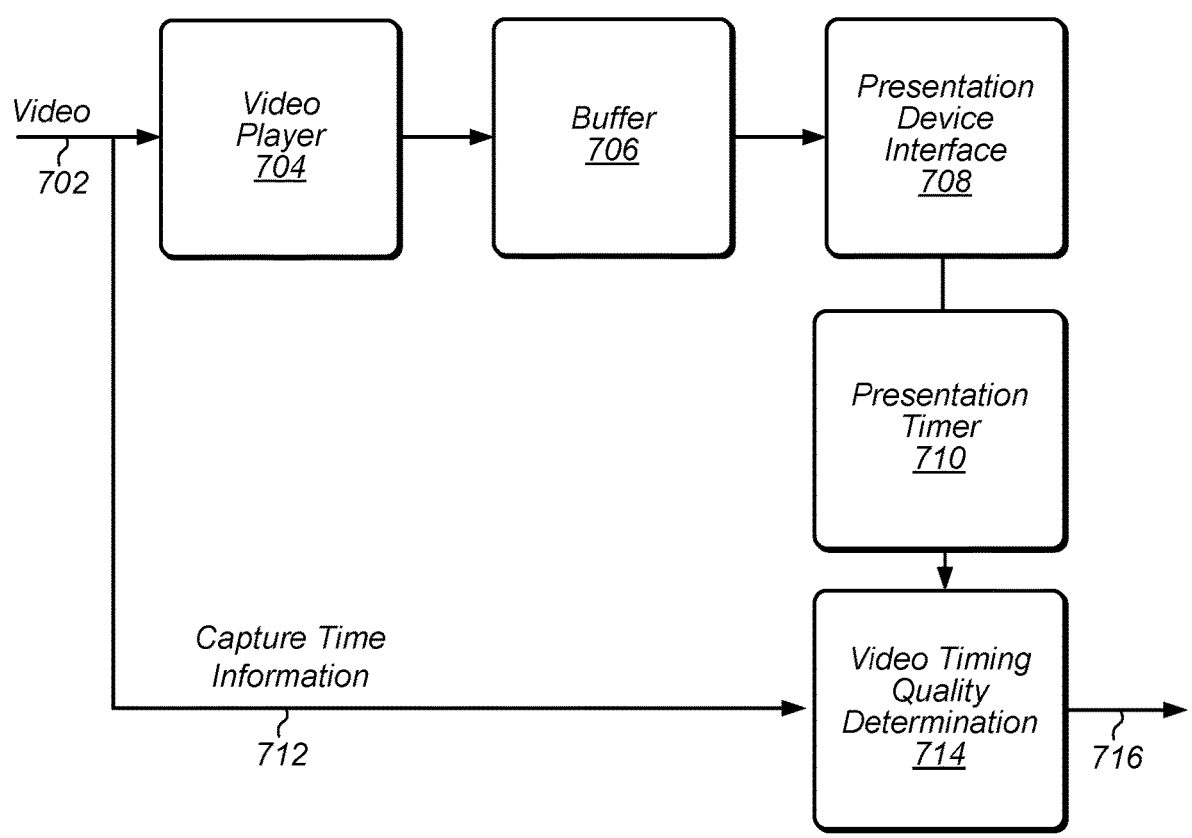
FIG. 7 illustrates a block diagram of a video presentation system in accordance with some embodiments.
Figure 8:
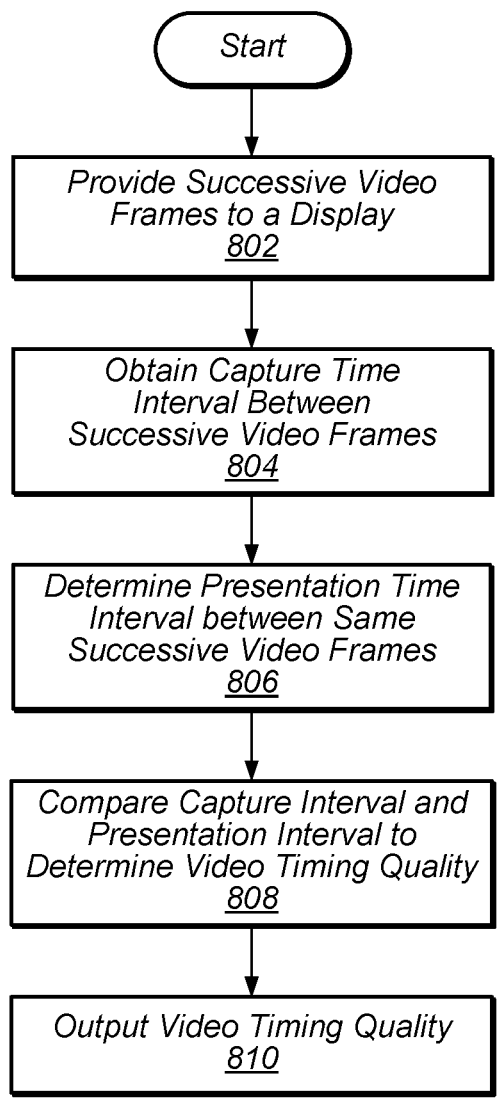
FIG. 8 is a flow chart illustrating a method of determining a video timing quality according to various embodiments.
Figure 9:
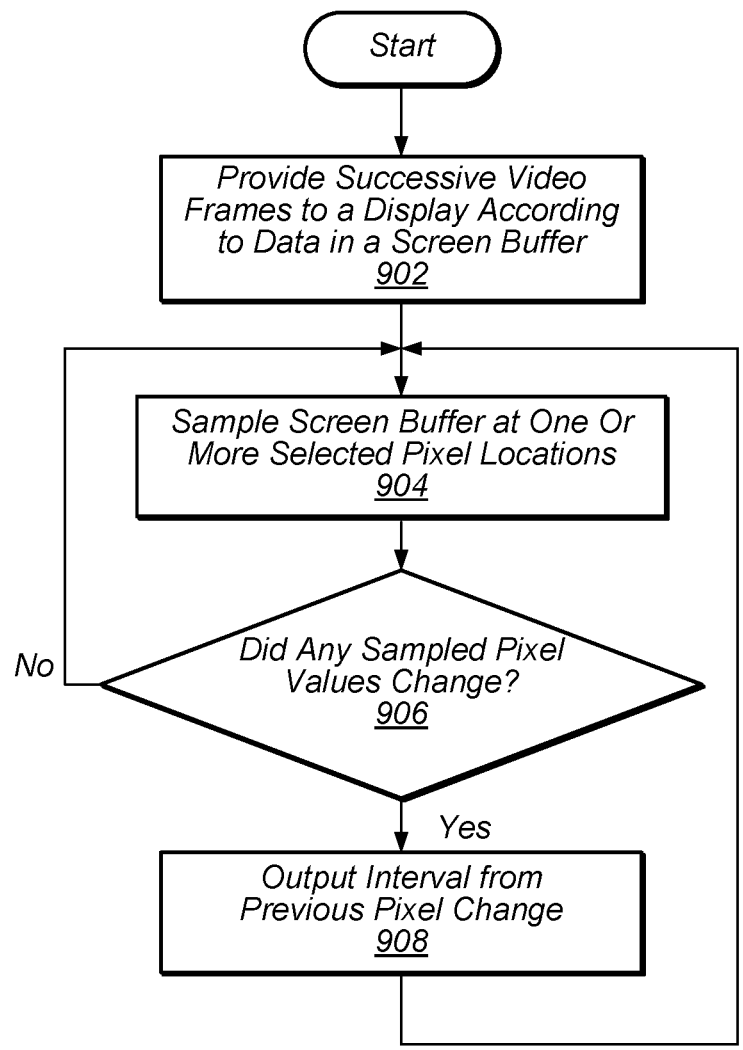
FIG. 9 is a flow diagram of a method for determining presentation timing in accordance with some embodiments.

The image sensor data processor 200 may support analysis of video timing as part of the VF analysis. For example, as illustrated in FIGS. 7, 8 and 9, described below, image sensor data processor 200 may measure and record time intervals between captured video frames instead of relying upon a nominal rate. In some embodiments, the differences between the actual presentation times of successive frame presentations may be calculated and compared to the time intervals recorded during image capture. The calculated differences may be used as a measurement of a video fidelity metric or to adjust the presentation timing to improve video fidelity, for example. In some embodiments, synthesis of retimed reference frames may be performed as part of the video fidelity (VF) measurement.

FIG. 2 illustrates an exemplary image sensor data processor 200, according to some embodiments. Image sensor data processor 200 may perform the method of image quality determination illustrated in FIGS. 3 and 4. In some embodiments, the image sensor 204 is part of the image sensor data processor 200, while in other embodiments, the image sensor 204 may be separate from image sensor data processor 200, but coupled to image sensor data processor 200. In some embodiments, not illustrated, image sensor data processor 200 may analyze raw captured images directly from image sensor 204. The image sensor data processor 200 may compare raw image data that is stored in temporary buffer 210 to the processed image to determine the image quality of the processed image. In the illustrated example, image sensor data processor 200 compares pre-processed image data that is stored in temporary buffer 210 to the processed image to determine the image quality of the processed image.

Image sensor data processor 200 includes image data processing components such as image data pre-processor 206, encoder 212, and decoder 214. Image sensor data processor 200 may also include image data fault detector 208 for detecting faults such as by the image sensor or image data pre-processor 206, and a temporary buffer 210 for temporarily retaining image data. Image sensor data processor 200 may also include reference image data quality comparator 216 for comparing two images to determine an image quality, capture timer 218 for determining the time the image was captured or time intervals between captures, and output buffer 220 for storing various portions of an image frame as the various portions of the image are processed from the image sensor 204.

Image sensor data processor 200 includes image data pre-processor 206 that pre-processes image data 224 from image sensor 204 before the image data is further processed (e.g., compressed). Image data pre-processor 206 may correct for lens distortion and white balance, for example. Image data pre-processor 206 may output corrected image data 226. Image data pre-processor 206 may be implemented as software or hardware. Embodiments of pre-processor 206 may be realized using one or more custom-designed hardware devices such as an ASIC.

Image sensor data processor 200 includes image data fault detector 208 that may apply one or more heuristics to image data to determine a fault. For example, image data fault detector 208 may analyze images captured directly from image sensor 204. However, in various embodiments, image data fault detector 208 may analyze images from any of various points along the data flow following capture at the sensor. For example, the image data fault detector 208 may analyze the image data after pre-processing by image data pre-processor 206. In some embodiments, the image data fault detector 208 determines faults of the image data pre-processor 206. Image fault detector 208 may analyze the image data with various other heuristic-based tests, such as tests for the enclosure faults, lens faults, imager chip faults, data connection faults, or local storage faults, etc. Image fault detector 208 may output a fault indicator 236. For example, fault indicator 236 may be output from fault detector 208 to output buffer 220 and stored as metadata for the image. Image fault detector 208 may determine that data pre-processor 206 is functioning correctly when a fault is not detected. For example, that white balance is within expectations, as described herein Image sensor data processor 200 includes temporary buffer 210 that may temporarily retain corrected image data 226. In some embodiments, the temporary buffer retains the corrected image data until the corrected image data can be compared to a processed version of the same corrected image data. In some embodiments, temporary buffer 210 may be an existing part of a commercial off the shelf encoder/decoder. In other embodiments, temporary buffer 210 may be a customized part of an encoder/decoder. Temporary buffer 210 outputs corrected image data 226. For example, the same corrected image data 226 that was output from image data pre-processor 206. In some embodiments, temporary buffer 210 may retain image data directly from image sensor 204.

Image sensor data processor 200 includes encoder 212 that may encode corrected image data 226 into encoded image data 228. Encoder 212 may convert information contained within the image data from one format or code to another format or code. For example, the encoding may be for the purpose of standardization, secrecy, security, speed, or saving space (e.g., by compression), etc. In FIG. 2, encoder 212 takes corrected image data 226 as input and produces encoded image data 228 as output. For example, encoder 212 may compress the corrected image data output from image data pre-processor 206 into compressed image data that is output to decoder 214 and output buffer 220. In some embodiments, encoder 212 may take uncorrected image data 224 as input directly from image sensor 204.

In various embodiments, image sensor data processor 200 includes decoder 214 for decoding encoded image data 228 from encoder 212 into decoded image data. Decoder 214 takes encoded data 228 as input and produces decoded image data 240, 244. For example, decoder 214 may decompress the compressed image data from encoder 214. Decoder 214 provides decoded image data 240 to the encoder 212. In various embodiments, the decoded image data 240 provided to encoder 212 may be used as part of the prediction functionality of the encoder. This feedback loop may contribute to the time-critical nature of the disclosed devices and methods. For example, this feedback loop may be timing critical since subsequently-processed image data may depend upon the decoding of prior image data and latency introduced by the decoding can slow processing of the next portion of image data. Decoder 214 also outputs decoded image data 244 to reference image data quality comparator 216. Decoded image data 244 and decoded image data 240 may or may not the same decoded image data. For example, decoded image data 240 may be further processed for motion compensation, in some embodiments.

In various embodiments, image sensor data processor 200 includes reference image data quality comparator 216 for comparing a decoded version of encoded image data to a pre-encoding version of the same image data. Reference image data quality comparator 216 takes decoded image data and corrected image data as input and produces an image quality indicator as output. For example, reference image data quality comparator 216 may take decoded image data 244 from decoder 214 and corrected image data 226 from temporary buffer 210, compare corrected image data 226 to the decoded image data 244 and output a quality indicator 234 that indicates the image quality of the decoded image data 244. In some embodiments, reference image data quality comparator 216 may take uncorrected image data (e.g., raw image data directly from the sensor) to compare to decoded uncorrected image data and output a quality indicator. Reference image data quality comparator 216 outputs the quality indicator 234 to output buffer 220, for example, to be included as metadata for the image. In various embodiments, reference image data quality comparator 216 may aggregate a plurality of quality indicators for a plurality of image data and output a measure of an image quality metric. For example, reference image data quality comparator 216 may combine a plurality of the quality indicators for a plurality of respective macroblocks of a video frame and create a measure of a mean square error (MSE), structural similarity index (SSIM) or Row-Col metric (row-column metric is a metric for indicating video quality that may be calculated based on a squared difference, absolute value or other two-parameter function rather than the absolute value as a measure for each row, column, or patch for the video frame) and output the metric measure value to the output buffer 220 as metadata for the video frame. In some embodiments, the image sensor data processor 200 may include an output buffer configured to output the image or video frame that comprises data corresponding to the processed image data wherein the output is to a system memory or other system component of the device. For example, output buffer 220 may output the image or video frame that comprises data to system memory (e.g., datastore 120 in FIG. 1) over I/O interface 130.

In various embodiments, image sensor data processor 200 includes capture timer 218 for capturing timing information 230 for the images. For example, capture timer 218 can capture a timing interval between frames of a video. In some embodiments, capture timer 218 captures the absolute time at the time of image capture. The absolute time may be used to determine an interval time between the captured image and a previously captured image. In other embodiments, capture timer 218 captures an interval time between the captured image and a previously captured image without determining the absolute time. In some embodiments, capture timer 218 obtains timing information as early as possible, for example, from image sensor 204 or from image data pre-processor 206.

In various embodiments, a time interval may be transported through the image processing pipeline. For example, the time interval may be transported as data within the image data or the metadata for the image or in a separate timing file associated with the image file. In some embodiments, the capture time intervals (or the capture times) may be transported along with the frame images through the entire chain of encoding, buffering, transport, storage, and decoding such that the timing information for each frame is available at presentation or for other analysis.

Image sensor data processor 200 outputs image data 242 to I/O interface 130. For example, image sensor data processor 200 outputs a compressed frame with metadata for the frame that includes a fault indicator, a capture time interval, and metric measures for image quality or various combinations thereof to system memory or some other system component.

Figure 3:
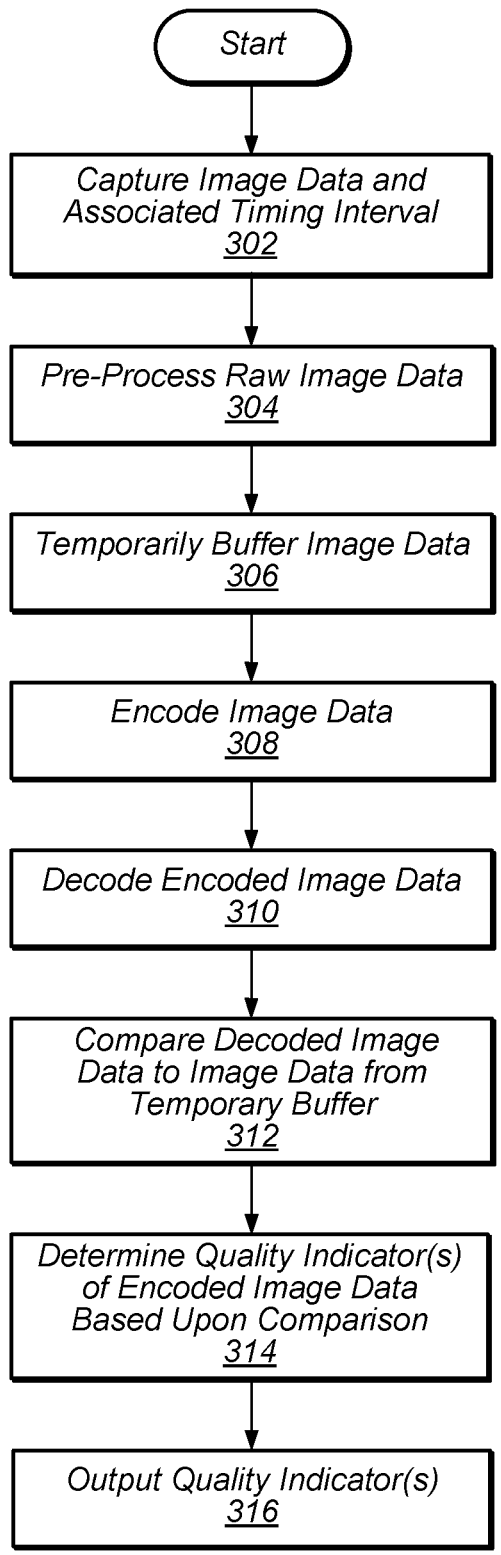
FIG. 3 illustrates a flow diagram of a method of video quality determination in accordance with some embodiments.

FIG. 3 is a flowchart illustrating a method of image quality analysis based upon comparison of a reference image to a decoded version of the reference image, according to some embodiments. The method illustrated in FIG. 3 can be performed by various components of the image sensor data processor 200 illustrated in FIG. 2.

The method illustrated in FIG. 3 starts with capturing image data and a timing interval associated with the captured image data (block 302). For example, image sensor 204 may capture image data 224 and capture timer 218 may determine a timing interval 230 associated with the captured image data 224, as illustrated in FIG. 2 and described above. The raw image data may be pre-processed (block 304). For example, by image data preprocessor 206, into corrected image data 226. The image data may be temporarily buffered (block 306) and the image data may also be encoded (block 308). In some embodiments, temporary buffer 210 retains corrected image data 226 while encoder 212 encodes the corrected image data into encoded image data 228. The encoded image data may be decoded (block 310). For example, decoder 214 may decode encoded image data 228 into decoded image data 244 and 240. The decoded image data may be compared to image data from a temporary buffer (block 312), quality indicator(s) of encoded image data may be determined (block 314) and quality indicator(s) may output (block 316). In some embodiments, reference image data quality comparator 216 compares decoded image data 244 from decoder 214 to corrected image data 226 from the temporary buffer 210 to determine image quality indicator 234 and the image quality indicator is output to output buffer 220. In some embodiments, image quality indicator 234 indicates the quality of decoded image data 244. In some embodiments, the image quality indicator 234 can be used to evaluate the compression scheme used by the encoder 212.

Figure 4:
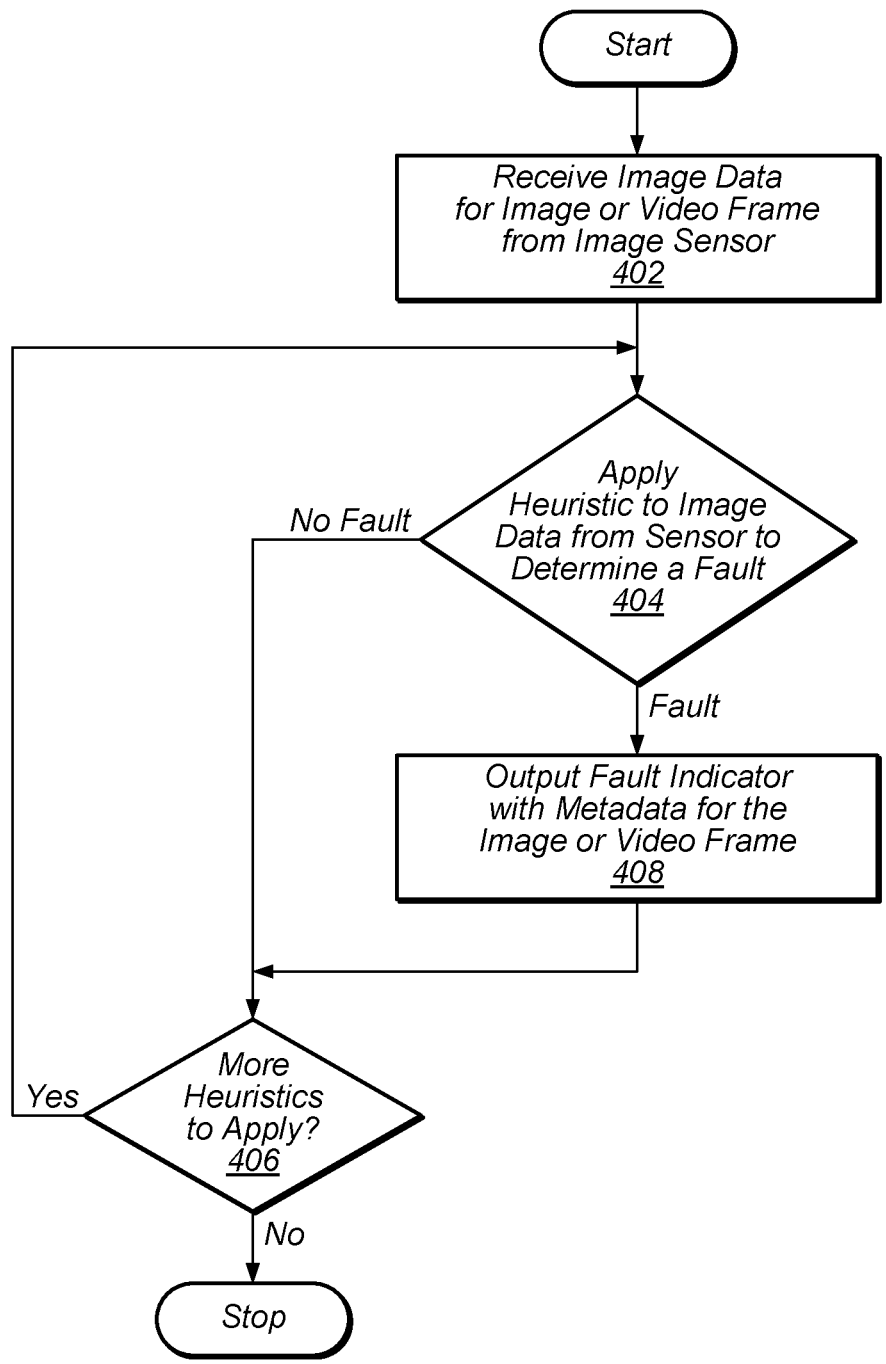
FIG. 4 illustrates another flow diagram of a method of video quality determination in accordance with some embodiments.

FIG. 4 illustrates a method of image fault detection using heuristics to determine faults, in accordance with various embodiments. The method illustrated is performed by image fault detector 208, in some embodiments. The method is performed prior to output of the respective image frame to I/O interface 130. In some embodiments, the method is performed on an image in real-time with capture of the image. In some embodiments, the method is performed in coordination with an image sensor pipeline that processes images captured by the image sensor, for example, image sensor 204. The method starts with receiving image data from image sensor output (block 402). For example, image data fault detector 208 may receive corrected image data 226 from image data pre-processor 206 (illustrated in FIG. 2) or, directly from image sensor 204 (not illustrated). One or more heuristics are applied to the image data from the sensor to determine a fault indicator (block 404), for example, by image data fault detector 208. If a fault is not detected (block 404, no fault) the method determines if there are more heuristics to apply (block 406). If a fault is detected (block 404, fault) a fault indicator is output as metadata for the image or video frame (block 408) and then the method determines if all of the heuristics have been applied to the image data (block 406). For example, image data fault detector 208 may output a fault indicator 236 to the output buffer 220 where the fault indicator may be included with the metadata for the image or video frame. The image data fault detector 208 may determine if there are any other heuristics to apply to the image or video frame (block 406). If there are more heuristics to apply (block 406, yes) the method returns to applying the next heuristic to the image data to determine a fault (block 404). If there are no more heuristics to apply (block 406, no) to the image or video frame, the method stops. In some embodiments, the method may be performed again for another image or video frame, repeatedly.

Figure 5:
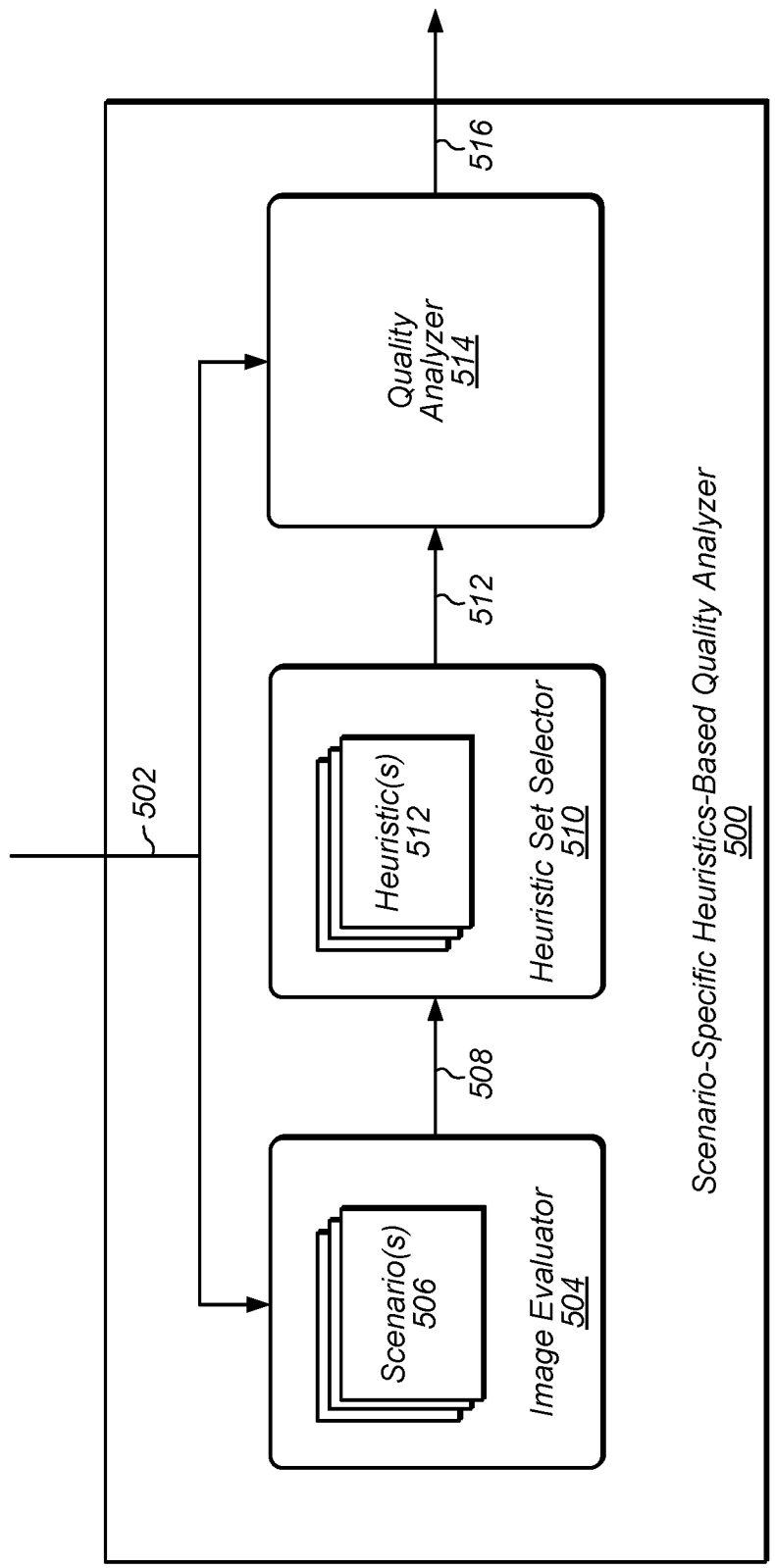
FIG. 5 illustrates a scenario-specific heuristics-based quality analyzer in accordance with some embodiments.

FIG. 5 illustrates scenario-specific heuristics-based quality analyzer 500. Scenario-specific heuristics-based quality analyzer 500 may perform the method illustrated in FIG. 6 to determine an image quality metric measurement. Scenario-specific heuristics-based quality analyzer 500 includes image evaluator 504 for determining whether a plurality of predefined scenarios 506 match scenes from images, heuristic set selector 510 for selecting a set of heuristics from a plurality of scenario-specific heuristic sets 512 based upon a matched scenario and quality analyzer 514 for applying the heuristic set 512 to the image to determine an image quality of the image.

Image evaluator 504 takes an image 502 as input, applies various scenarios 506 to the image 502 to select a matching scenario from a plurality of scenarios and outputs the selected scenario 508 to heuristic set selector 510. Heuristic set selector 510 takes the selected scenario 508 as input, determines a set of heuristics from a plurality of scenario-specific heuristic sets based on the selected scenario and passes the selected scenario set as output 512 to quality analyzer 514. Quality analyzer 514 takes the selected scenario set 512 and the image 502 as input and applies the selected scenario set 512 to the image 502 to determine an image quality metric 516 that is output. In some embodiments, if a scenario cannot be matched, a default heuristic set may be applied to the image or the next image may be selected for analysis by the scenario-specific heuristics-based quality analyzer 500.

Scenario-specific heuristics-based quality analyzer 500 and the components 504, 510 and 514 of the scenario-specific heuristics-based quality analyzer 500 may be implemented as components of application software. The application software may be stored in memory or datastore, for example datastore 120 of device 100. The application software may be executed by a processor on one or more computing devices. For example, by processor(s) 110 of device 100 in FIG. 1. Scenario-specific heuristics-based quality analyzer 500 is not necessarily implemented on the same device where the image was captured. For example, in some embodiments, scenario-specific heuristics-based quality analyzer 500 may be implemented as application software for a personal computer.

Figure 6:
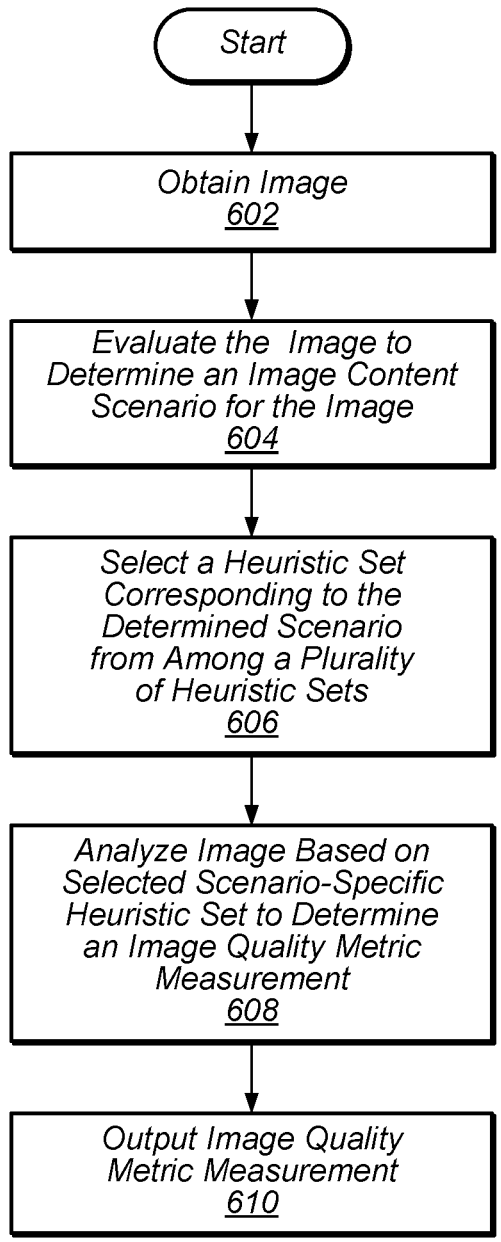
FIG. 6 is a flow diagram of a method of scenario-based video quality determination.

FIG. 6 is a flow diagram of a method of scenario-based video quality determination. The method may be performed by scenario-specific heuristics-based quality analyzer 500. The method starts with obtaining an image (block 602) and evaluating the image to determine an image content scenario for the image (block 604). For example, image evaluator 504 may obtain image 502 (e.g., from datastore 120 of device 100) and compare various predetermined scenarios 506 to the image 502 to determine a particular scenario of the predetermined scenarios 506 that matches the scene of the image 502. In some embodiments, a plurality of scenarios may be matched. One or more heuristic set(s) corresponding to the determined scenario(s) may be selected from among a plurality of heuristic sets (block 606). For example, heuristic set selector 510 may select a heuristic set from a plurality of heuristic sets 512 because the selected heuristic set corresponds to the scenario 508 received from image evaluator 504. The image may be analyzed based on the selected scenario-specific heuristic set(s) to determine an image quality metric measurement (block 608). The image quality metric measurement may be output (block 610). For example, quality analyzer 514 may analyze image 502 using selected scenario specific heuristic set(s) 512 from heuristic set selector 510 to determine an image quality metric measurement and output the image quality metric measurement 516.

In some embodiments, the obtaining, evaluating, selecting, analyzing and outputting of blocks 602, 604, 606, 608 and 610 of FIG. 6 may be repeated to determine a plurality of image quality metric measurements for a respective plurality of images of a video. The image quality metric measurements may be used to support various types of functionality. In one embodiment, in response to determining that the image quality metric exceeds the threshold, an image quality indicator may be output for use in navigating to the particular image associated with the image quality metric. Because the image quality indicator may be associated with a particular image, it may be used as a navigational component. For example, for a graphical image quality comparison software application, if the image quality metric exceeds a threshold (the same or a different threshold) the particular image associated with the image quality metric may be navigated to such that an observer may evaluate the human-perceptible quality of the image.

In some embodiments, the scenario-based video quality determination illustrated in FIG. 6 may be performed by the image sensor data processor 200 illustrated in FIG. 2. For example, image data fault detector 208 may perform the evaluating, selecting, analyzing and outputting of blocks 604, 606, 608 and 610 of FIG. 6. In another embodiment, scenario-specific heuristics-based quality analyzer 500 may be incorporated into, coupled with, or work in coordination with image sensor data processor 200 and perform the obtaining, evaluating, selecting, analyzing and outputting of blocks 602, 604, 606, 608 and 610 of FIG. 6

Video frames may be synthesized, for example to determine video fidelity of video images and video fidelity of video sequences. For example, a frame may be synthesized that would have been correct at the actual time of presentation and the synthesized frame can be used as the reference frame for fidelity metrics that benefit from full-reference analysis. In some embodiments, a synthetic video frame may be synthesized from the successive video frames such that the content of the synthetic video frame exhibits expected content at some time between two video frames. Some of many possible exemplary adjustments to the content include adjustments to compensate for movement within the image scene or panning.

In some embodiments, one of the successive video frames may be replaced with a synthetic video frame. In some embodiments, the synthetic video frame may be compared to one of the frames it was synthesized from. In some embodiments, the synthetic video frame may be compared to the frame it replaced. In some embodiments, a synthetic video frame may be created and included in the video sequence without replacing another frame. For example, a synthetic video frame may be inserted into a sequence of video frames that exhibit a time gap between the images. The synthesized video sequence may be compared to the original video sequence. Comparison may be performed to determine a video quality metric measurement, for example. Exemplary video quality metrics may include SSIM and MSE as described above, or another metric particularly suited to synthetic frame image quality.

In order to improve upon the presentation timing it is useful to know the magnitude of difference between the actual presentation timing and the desired presentation timing. It may be more important to reenact the timing experienced at capture than to achieve regular, cyclical presentation timing. As such, timing intervals may be preferred to time instances, although, in some embodiments, timing intervals may be created from time instances. In some embodiments, time intervals may be determined without reliance upon a nominal rate or without reliance upon individual timestamps of the frames.

FIG. 7 illustrates a block diagram of a video presentation system in accordance with some embodiments. In various embodiments, measuring a presentation time interval does not rely on the nominal frame rate. In one exemplary alternative to relying on a nominal rate, presentation timing determination may be performed by sampling a screen buffer location associated with a pixel of the display. Once the presentation time of the current frame is known it may be compared to a prior frame's presentation time (e.g., gathered the same way) and a presentation time interval can be calculated. The difference between the capture interval and the presentation interval may be measured and output as a metric measurement.

The video presentation system illustrated in FIG. 7 includes video player 704 for taking video image data 702 as input and providing video image data to buffer 706. For example, a personal computer running a video image quality evaluation software application integrated with a video player application that outputs video image data to a graphics card. The buffer 706 provides video image data to presentation device interface 708 which drives a display, for example display 140. The video presentation system illustrated in FIG. 7 includes presentation timer module 710 for determining presentation timing.

In some embodiments, presentation timing may be received from or determined by presentation device interface 708. In some embodiments, presentation device interface 708 may be configured to receive presentation timing information from a display that displays the images. The display may be coupled to the presentation device interface 708 such that presentation device interface may receive presentation timing information from the display or the presentation device interface 708 may actively determine the presentation timing information from interacting with the display. For example, presentation timing device 708 may monitor the display that displays the images and determine when the display changes between frames. The presentation timer 710 may use the time of the change or an interval between successive changes to determine presentation timing information. In some embodiments, the presentation timer module 710 is configured to obtain the presentation time as late in the process as possible, up to and including, from the display device. For example, obtaining the presentation time as an estimate of the time the light leaves the display. Although, in some embodiments, presentation timer module 710 may determine or receive presentation timing from buffer 706 or video player 704.

The video presentation system illustrated in FIG. 7 also includes video timing quality determination module 714. Video timing quality determination module 714 accepts presentation timing from presentation timer module 710 and obtains capture time information 712 from video image data 702 and outputs a video timing quality metric measurement 716. In some embodiments, the capture time information 712 includes capture time intervals, for example, captured by capture timer 218 illustrated in FIG. 2 and described above. In other embodiments, the capture time information 712 is a capture time that indicates the time the image was captured. Video timing quality determination module 714 may receive the capture time information in a number of ways. The capture time information 712 may be incorporated into the video image data 702, for example, as metadata for the file. Alternatively, the capture time information 712 may be part of a separate timing file for the video. In some embodiments, the system illustrated in FIG. 7 performs the methods illustrated in FIGS. 8 and 9.

FIG. 8 is a flow chart illustrating a method of determining a video timing quality according to various embodiments. In some embodiments, the methods described with regard to FIG. 8 may be carried out on the same device that captured the images being presented. In other embodiments, the methods described with regard to FIG. 8 may be carried out on a different device than the one that captured the images. However, the illustrated and described features of device 100 may still provide a useful illustration and description of the features of the different (presentation) device as well, even though the different device may include more or less features than illustrated for device 100. As such, reference to device 100 and elements or functionality of device 100 should be understood to refer to either of the capture device used to capture the images or a different presentation device used to present the same images, depending on the embodiment.

Successive video frames may be provided to a display (block 802). For example, successive video frames may be provided to display 140. A non-exhaustive list of exemplary video frame sources includes datastore 120 or transmission channel 150 or from image sensor data processor 200. Capture time intervals for the successive video frames may be obtained (block 804). For example, capture time intervals may be obtained from metadata of the video frames. In some embodiments, the capture time intervals are the same timing intervals captured in block 302 in FIG. 3. Presentation time intervals between the same successive video frames are determined (block 806). For example, by presentation timer module 710 performing the method illustrated in FIG. 9 and described below. The capture time intervals are compared to the presentation intervals to determine video timing quality (block 808) and a measure of the timing quality is output (block 810). For example, the presentation intervals determined by the system illustrated in FIG. 7 are compared to the capture intervals stored as metadata with the video frames. The comparison may be performed by video timing quality determination module 714 to determine a measure of the timing quality 716.

The method illustrated in FIG. 9 starts with providing successive video frames to a display according to data in a screen buffer (block 902). For example, video player 704 may provide video frame data 702 from datastore 120 to buffer 706. One or more selected pixel locations of a screen buffer may be sampled (block 904). For example, one pixel location (or several pixel locations) for the buffer 706 may be sampled. A determination of whether at least one of the sampled pixel values has changed is made (block 906), for example, the sampled pixel(s) of buffer 706. In some embodiments, if no sampled pixel value has changed within a threshold for some expected presentation time period, one or more new pixel locations are selected and sampled (block 906, no). If a sampled pixel value did change (block 906, yes), an interval from the previous pixel change is output (block 908). This calculation may be repeated for multiple sequential frames. For example, the calculation may be repeated for every frame, for every other frame, for every third frame, etc., or for every frame where processing cycles are available to make the calculation. Such analysis may effectively measure the relative timing irregularity in presentation across a video image sequence. In some embodiments, the timing metric is not output for the frame or an error is indicated for the frame if a respective interval cannot be determined.

In some embodiments, timing data may be aggregated and analyzed and a time metric value may be determined for a video. For example, the timing irregularity data may be aggregated or pooled and/or statistically analyzed to develop timing metrics for the video. In some embodiments, video timing quality determination module 714 may pool or aggregate together the individual measures of timing quality for each frame into a quality metric for the entire video sequence. Alternatively, the individual timing quality measures may be pooled for some segment(s) of the video sequence. For example, timing metrics such as mean squared fractional offset and/or mean absolute offset may be calculated. Mean squared fractional offset may calculated as follows:

Let $C[i]$ be the inter-frame time for captured frame i.

(0<i<video duration in frames)

Let $P[i]$ be the inter-frame time for presentation of frame i.

Determine the average frame rate of the captured video:

$$MFR = \text{Average}(C[i])$$

Then, find the squared timing error for each frame time after the first:

$$SFO[i] = (P[i] - C[i])^2$$

Then, form the Mean Squared Fractional Offset metric for the video:

$$MSFO = \text{Average}(SFO[i])/MFR$$

Just as for image fidelity metrics, there are many candidate formulas for timing fidelity metrics that have different properties and will be found useful in different contexts.

Figure 10:
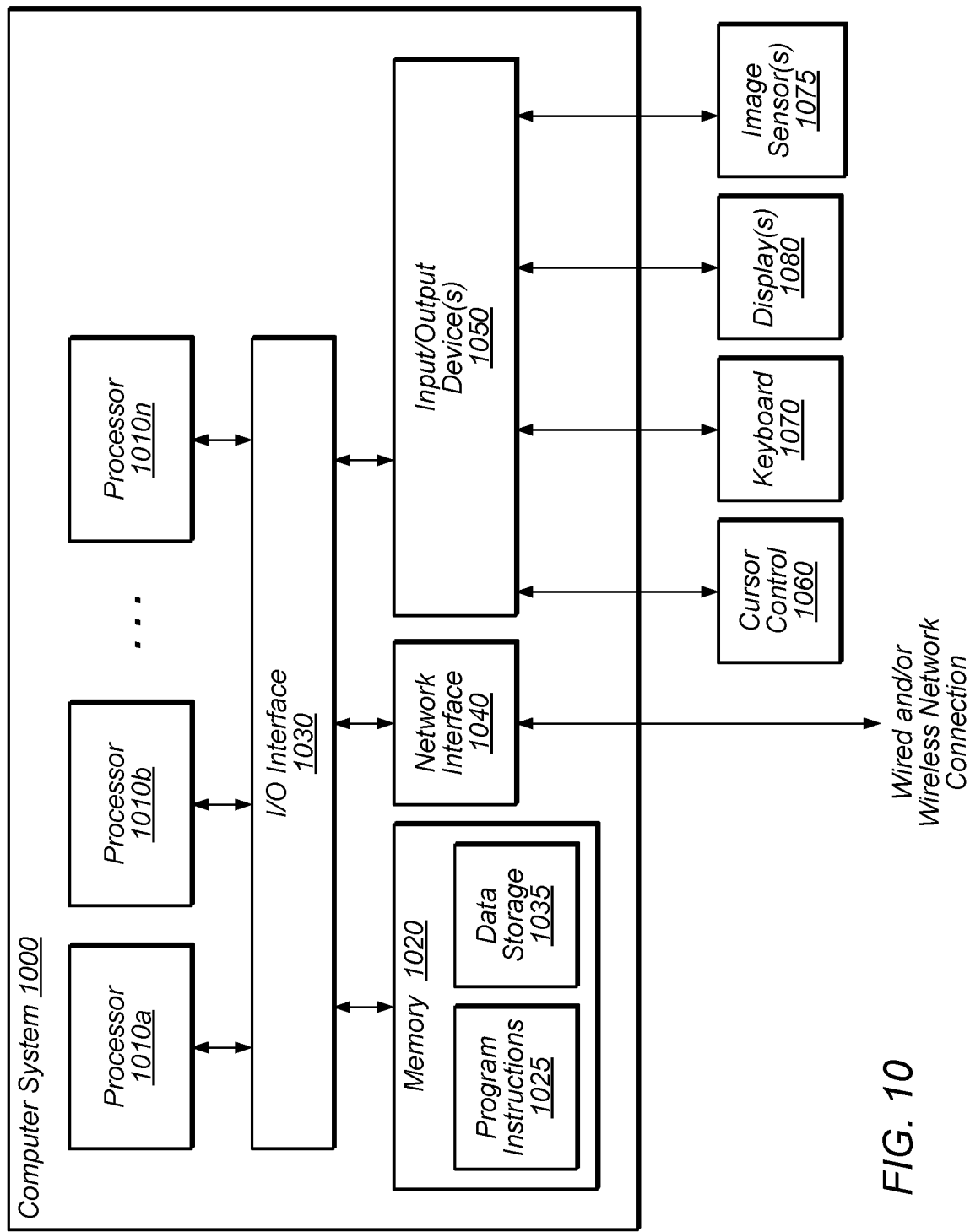
FIG. 10 illustrates a system diagram of a computer system in accordance with some embodiments.

FIG. 10 illustrates computer system 1000 that is configured to execute any or all of the embodiments described above. In different embodiments, computer system 1000 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for highlighting features in a 3D map while preserving depth, as described herein, may be executed on one or more computer systems 1000, which may interact with various other devices. Note that any component, action, or functionality described above with respect to FIGS. 1-6 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, display(s) 1080, and image sensor(s) 1075. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g. two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1025 and/or data 1035 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1025 may be configured to implement a video quality evaluation application incorporating any of the functionality described above. Additionally, data 1035 of memory 1020 may include video quality evaluation information 1035 including any of the information or data structures described above, including but not limited to video images for evaluating, various parameter values used in implementing the techniques described herein. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g. system memory 1020) into a format suitable for use by another component (e.g. processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g. carrier or agent devices) or between nodes of computer system 1000. The network may in various embodiments include one or more networks including but not limited to Local Area Networks (LANs) (e.g. an Ethernet or corporate network), Wide Area Networks (WANs) (e.g. the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, which may be processor-executable to implement any element or action described above. In one embodiment, the program instructions may implement the methods described above, such as the methods illustrated by FIGS. 6, 7 and 9. In other embodiments, different elements and data may be included. Note that data 1035 may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g. as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g. disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
   one or more computer processors; and
   memory storing program instructions that are executed by the one or more computer processors to implement a heuristic-based analyzer configured to:
   evaluate captured video to detect one or more faces in at least a first frame and a second frame of the video; and
   in response to detection of one or more faces in the video,
   analyze at least a portion of the first frame of the video including the detected one or more faces with one or more face-scenario-specific heuristics to produce a first image quality metric;
   analyze at least a portion of the second frame of the video including the detected one or more faces with the one or more face-scenario-specific heuristics to produce a second image quality metric; and output a video quality metric based at least in part on the first image quality metric and the second image quality metric.

2. The system of claim 1,
wherein the face-scenario-specific heuristics comprise quality indicators for one or more characteristic features of the video; and
wherein to perform said analyze at least the portion of the first frame of the video with the one or more face-scenario-specific heuristics, the memory stores additional instructions that are executed to apply the quality indicators to corresponding features of the first frame of the video to produce the first image quality metric.

3. The system of claim 1, wherein the memory stores additional program instructions that are executed to:
repeat said evaluate, and said analyze for a plurality of video images of the video to create a plurality of image quality metric measurements from a respective plurality of video images;
determine, based at least in part on a comparison of at least one of the plurality of image quality metric measurements to a threshold, whether the image quality metric measurements indicate poor image quality; and
in response to a determination that the at least one of the image quality metric measurements exceed the threshold, output an image quality indicator for use in navigation to a particular image associated with the image quality metric measurements.

4. The system of claim 1, wherein the face-scenario-specific heuristics identify high contrasts and sharp detail in a facial area.

5. The system of claim 1, further comprising:
an image sensor to capture the video; and
an image sensor data processor configured to process the video captured from the image sensor into processed versions of the captured video and evaluate a quality of the processed version of the captured video;
wherein the heuristic-based analyzer is configured to work in coordination with the image sensor data processor.

6. The system of claim 1, further comprising:
an image sensor to capture the video; and
a video data pre-processor configured to correct for one or more distortions in the video from the image sensor,
wherein the face-scenario-specific heuristics are applied to determine that the video data pre-processor is functioning correctly.

7. The system of claim 1, further comprising:
an image sensor to capture the video; and
an encoder configured to compress image data of the video from the image sensor, wherein to perform said analyze at least the portion of the first frame of the video the memory stores program instructions that cause the heuristic-based analyzer to analyze image data decompressed from the compressed image data.

8. The system of claim 1, wherein to perform said analyze the video with the one or more face-scenario-specific heuristics the memory stores program instructions that are executed to identify an area with chroma that falls within a human skin-tine chromaticity range.

9. The system of claim 1, wherein to perform said analyze the video with the one or more face-scenario-specific heuristics the memory stores program instructions that are executed to:
identify one or more facial features; and
apply one or more of the face-scenario-specific heuristics in accordance with finding high contrasts and sharp detail in a facial area.

10. The system of claim 1, further comprising;
an encoder configured to process regions of frames of the video as macroblocks, or stripes of the video;
wherein said analyze the video with one or more face-scenario-specific heuristics is performed on one or more of the regions of the video instead of on an entire frame of the video.

11. The system of claim 1, wherein to perform said output the video quality metric, program instructions cause the one or more processors to perform instructing an indication of the video quality metric on a device display.

12. One or more non-transitory, computer-readable storage media storing instructions that, when executed on or across one or more processors, cause the one or more processors to perform:
evaluate captured video to detect one or more faces in at least a first frame and a second frame of the video; and
in response to detection of one or more faces in the video, analyze at least a portion of the first frame of the video including the detected one or more faces with one or more face-scenario-specific heuristics to produce a first image quality metric;
analyze at least a portion of the second frame of the video including the detected one or more faces with the one or more face-scenario-specific heuristics to produce a second image quality metric; and
output a video quality metric based at least in part on the first image quality metric and the second image quality metric.

13. The non-transitory, computer-readable storage media of claim 12, wherein the face-scenario-specific heuristics comprise one or more quality indicators for one or more characteristic features of the video, and wherein to perform said analyze at least a portion of the first frame of the video with the face-scenario-specific heuristics the media includes program instructions that are further executed to apply the quality indicators to corresponding features of the first frame of the video to produce the first image quality metric.

14. The non-transitory, computer-readable storage media of claim 12, wherein the instructions are further executed to:
repeat said evaluate, and analyze for a plurality of video images of the video to create a plurality of image quality metric measurements from a respective plurality of video images;
determine, based at least in part on a comparison of at least one of the plurality of image quality metric measurements to a threshold, whether the image quality metric measurements indicate poor image quality; and
in response to a determination that the image quality metric measurements exceed the threshold, output an image quality indicator for use in navigation to a particular image associated with the image quality metric.

15. The non-transitory, computer-readable storage media of claim 12, wherein the instructions are further executable to determine, based at least in part on application of the face-scenario-specific heuristics, that an image data pre-processor of a device is functioning correctly.

16. The non-transitory, computer-readable storage media of claim 12, wherein to perform said analyze at least a portion of the first frame of the video with the face-scenario-specific heuristics the media store instructions that, when executed, cause the one or more processors to identify an area with chroma that falls within a human skin-tine chromaticity range.

17. The non-transitory, computer-readable storage media of claim 12, wherein to perform said analyze the video with the face-scenario-specific heuristics the media store instructions that, when executed, cause the one or more processors to perform:
identify one or more facial features; and
apply one or more of the face-scenario-specific heuristics in accordance with finding high contrasts and sharp detail in a facial area associated with the one or more facial features.

18. The non-transitory, computer-readable storage media of claim 12, wherein to perform said analyze the video with the face-scenario-specific heuristics the media store instructions that, when executed, cause the one or more processors to perform:
identify one or more facial features of eyes, eyebrows, nose, lips, ears, or, eyeglasses; and
apply one or more of the face-scenario-specific heuristics in accordance with finding high contrasts and sharp detail in an area of the identified one or more facial features.

19. The non-transitory, computer-readable storage media of claim 12, wherein the media store instructions that implement a scenario-based quality analyzer configured to perform said analyze the video based on the face- scenario-specific heuristics, and to perform one or more other scenario-specific heuristics of a plurality of scenario-specific heuristics in an attempt to match a predetermined scenario with the video.

20. The non-transitory, computer-readable storage media of claim 12, wherein to perform said output the video quality metric, the media store program instructions that cause the one or more processors to perform instruction of an indication of the video quality metric.

21. A method, comprising:
evaluating captured video to detect one or more faces in at least a first frame and a second frame of the video; and
in response to detection of one or more faces in the video,
analyzing at least a portion of the first frame of the video including the detected one or more faces with one or more face-scenario-specific heuristics to produce a first image quality metric;
analyzing at least a portion of the second frame of the video including the detected one or more faces with the one or more face-scenario-specific heuristics to produce a second image quality metric; and
outputting a video quality metric based at least in part on the first image quality metric and the second image quality metric.

22. The method of claim 21, wherein the face-scenario-specific heuristics comprise one or more quality indicators for one or more characteristic features of the video, and wherein analyzing at least a portion of the first frame of the video with the face-scenario-specific heuristics includes applying the quality indicators to corresponding features of the first frame of the video to produce the first image quality metric.

23. The method of claim 21, further comprising:
repeating said evaluating, and analyzing for a plurality of video images of the video to create a plurality of image quality metric measurements from a respective plurality of video images;
determining, based at least in part on a comparison of at least one of the plurality of image quality metric measurements to a threshold, whether the image quality metric measurements indicate poor image quality; and
in response to a determination that the image quality metric measurements exceed the threshold, outputting an image quality indicator for use in navigation to a particular image associated with the image quality metric.

24. The method of claim 21, further comprising determining, based at least in part on application of the face-scenario-specific heuristics, that an image data pre-processor of a device is functioning correctly.

25. The method of claim 21, wherein analyzing at least a portion of the first frame of the video with the face-scenario-specific heuristics includes identifying an area with chroma that falls within a human skin-tine chromaticity range.

26. The method of claim 21, further comprising:
identifying one or more facial features; and
applying one or more of the face-scenario-specific heuristics in accordance with finding high contrasts and sharp detail in a facial area associated with the one or more facial features.

27. The method of claim 21, wherein analyzing the video with the face-scenario-specific heuristics comprises:
identifying one or more facial features of eyes, eyebrows, nose, lips, ears, or, eyeglasses; and
applying one or more of the face-scenario-specific heuristics in accordance with finding high contrasts and sharp detail in an area of the identified one or more facial features.

28. The method of claim 21, wherein outputting the video quality metric comprises displaying an indication of the video quality metric on a device display.

* * * * *

UNITED STATES PATENT AND TRADEMARK OFFICE
CERTIFICATE OF CORRECTION

PATENT NO. : 10,957,358 B2  
APPLICATION NO. : 16/252425  
DATED : March 23, 2021  
INVENTOR(S) : Krasimir D. Kolarov and Steven E. Saunders Page 1 of 1

It is certified that error appears in the above-identified patent and that said Letters Patent is hereby corrected as shown below:

In the Claims

Column 27, Line 37, in Claim 20, delete "metric." and insert -- metric on a device display. --.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*